United States Patent [19]

Gneiss et al.

[11] Patent Number: 4,538,457
[45] Date of Patent: Sep. 3, 1985

[54] APPARATUS FOR MEASURING THE MASS OF A FLOWING MEDIUM

[75] Inventors: Heinz Gneiss, Ludwigsburg; Jaihind S. Sumal, Vaihingen, both of Fed. Rep. of Germany

[73] Assignee: Robert Bosch GmbH, Stuttgart, Fed. Rep. of Germany

[21] Appl. No.: 563,857

[22] Filed: Dec. 21, 1983

[30] Foreign Application Priority Data

Feb. 5, 1983 [DE] Fed. Rep. of Germany ....... 3303885

[51] Int. Cl.$^3$ .................................................. G01F 1/68
[52] U.S. Cl. ......................................... 73/204; 338/25
[58] Field of Search ........................ 73/204; 338/25, 28

[56] References Cited

U.S. PATENT DOCUMENTS

| | | | |
|---|---|---|---|
| 3,900,819 | 8/1975 | Djorup | 73/204 |
| 3,971,247 | 7/1976 | Rodder | 73/204 |
| 4,276,773 | 7/1984 | Kawai et al. | |
| 4,299,125 | 11/1981 | Romann et al. | 73/204 |
| 4,450,714 | 5/1984 | Prohaska et al. | 73/204 |

OTHER PUBLICATIONS

Datametrics Bulletin 600, "Heated Sensor Finds Wide Applications in Fluid Flow", 10/70, pp. 5, 7, 8 and FIGS. 4–6.

*Primary Examiner*—Herbert Goldstein
*Attorney, Agent, or Firm*—Edwin E. Greigg

[57] ABSTRACT

An apparatus is proposed to measure the mass of a flowing medium, especially to measure the amount of aspirated air of internal combustion engines. The apparatus consists of an electronic regulating circuit and of a temperature-dependent measuring resistor in the form of a hot wire placed in the medium flow, which is led in the form of a coil around each of the hook-shaped ends of each of the supports. One end of the hot wire, the latter being covered with a thin, electrically insulating layer, is connected with the hook-shaped end in an electrically conducting manner, while the other end of the hot wire is connected with the hook-shaped end of the other support. The closely bundled hot wire coils can be covered with a common protective layer. The supports can serve as electrical connections for the hot wire and are fastened to a carrier.

4 Claims, 6 Drawing Figures

APPARATUS FOR MEASURING THE MASS OF A FLOWING MEDIUM

BACKGROUND OF THE INVENTION

The invention is based on an air flow rate meter. An apparatus is already known in which the hot wire comes into contact with each support point only one time in the distance from one to the other end. This results in a relatively large size of the apparatus.

OBJECT AND SUMMARY OF THE INVENTION

The contrast to the foregoing, the apparatus according to the present invention has the advantage that the apparatus is of small size, so that it can be placed into very narrow flow diameters while still having a high degree of measuring sensitivity.

By means of the steps described hereinafter, advantageous variations and improvements of the apparatus can be realized. It is especially advantageous to twist the hot wire coils together and to encase the hot wire coils with a common protective coating.

The invention will be better understood and further objects and advantages thereof will become more apparent from the ensuing detailed description of preferred embodiments taken in conjunction with the drawing.

DESCRIPTION OF THE PREFERRED EMBODIMENTS

Figure 1:
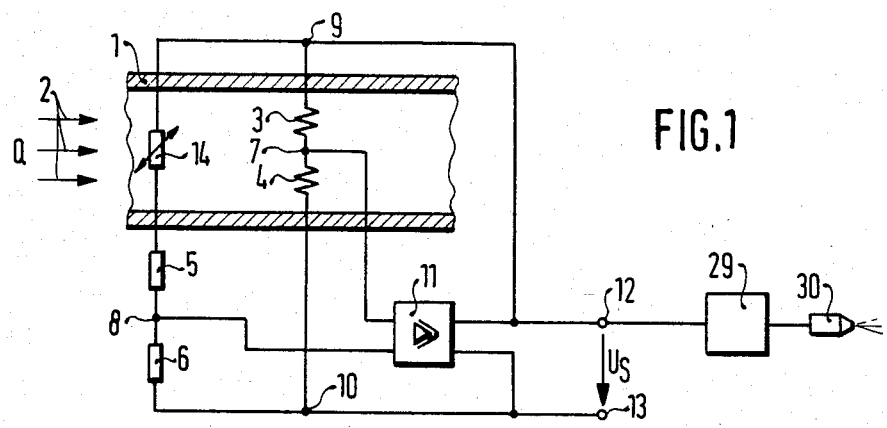
FIG. 1 is the switching diagram of an apparatus to measure the mass of a flowing medium.

In FIG. 1, there is shown a flow cross-section 1, for instance the air induction pipe of an internal combustion engine (not shown), through which a medium, for instance the air aspirated by the internal combustion engine, flows in the direction of the arrows 2. In the flow cross-section 1 there is shown as part of an apparatus to measure the mass of the flowing medium a temperature-dependent precision resistor 3 for measuring purposes, for instance a hot wire, through which flows the output variable of a regulator and which simultaneously delivers the input variable for the regulator. The temperature of the temperature-dependent measuring resistor 3 is set to a fixed value by the regulator, which is higher than the mean temperature of the medium. If the flow speed, i.e. the amount of medium flow mass per unit of time, is increased by a flow-through value of 0, the temperature-dependent measuring resistor 3 is cooled to a greater degree. This cooling-off is fed to the input of the regulator, so that the latter increases its output variable to the extent that the fixed temperature value is again achieved in the temperature-dependent measuring resistor 3. The output variable of the regulator adjusts the temperature of temperature-dependent resistor 3, based on changes in the flow-through values 0 of the medium, to the pre-set value and, at the same time, constitutes a measure of the flowing medium mass. This value can be fed to the metering circuit of an internal combustion engine in the form of a flow-through measuring value $U_S$ in order to adjust the necessary amount of fuel to the amount of air aspirated per unit of time.

The temperature-dependent resistor 3 is arranged in a resistance-measuring circuit, for instance in a bridge circuit and, together with a reference resistor 4, it forms a first bridge arm to which a second bridge arm, formed by the two fixed resistors 5 and 6, is switched in parallel. The pick-up point 8 is located between the resistors 3 and 4 and pick-up point 8 between the resistors 5 and 6. Both bridge arms are switched in parallel at points 9 and 10. The diagonal voltage of the bridge occurring between points 7 and 8 is fed to the input of an amplifier 11, to the output terminals of which points 9 and 10 are connected, so that its output variable supplies the bridge with operational voltage or operational current. As indicated, the flow-through measuring value $U_S$, which serves as the regulated variable, can be read between terminals 12 and 13.

The temperature-dependent measuring resistor 3 is heated by the current flowing through it to a value at which the input voltage of the amplifier 11, the bridge diagonal voltage, becomes zero or achieves a pre-set value. A defined current flows from the output of the amplifier 11 into the bridge circuit. If the temperature of the temperature-dependent measuring resistor 3 is varied because of changes in the amount 0 of the flowing medium, the voltage at the bridge supply voltage or the bridge current to a value at which the bridge is balanced again or is imbalanced in a pre-set manner. The output variable of the amplifier 11, that is, the regulated variable $U_S$, forms a flow-through measuring value for the amount of flowing medium, just as does the current in the temperature-dependent measuring resistor 3, for instance the amount of air aspirated by an internal combustion engine, and this can be fed to an electronic regulator or control unit 29, which, for instance, triggers at least one fuel injection valve 30.

In order to compensate for the influence of temperature of the medium it may be advantageous to switch a second temperature-dependent resistor 14, around which the medium also flows, into the second bridge arm. The size of the resistors 5, 6 and 14 should be selected in such a way that the power loss of the temperature-dependent resistor 14 caused by the branch current flowing through it is so small that the temperature of this resistor 14 does not, for all practical purposes, change with the changes of the bridge voltage, but always corresponds to the temperature of the medium flowing past it.

The reference resistor 4 is also advantageously placed in the flow cross-section, since in this way the heat due to energy losses of the reference resistor 4 can be dissipated by the flowing medium.

Figure 2:
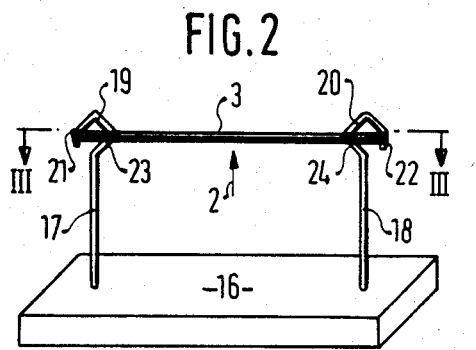
FIG. 2 is a first exemplary embodiment of an apparatus according to the invention.

A carrier 16 is shown in FIG. 2 in simplified form in the exemplary embodiment of an apparatus for measuring the mass of flowing medium. This carrier can essentially be of any cross-sectional configuration, e.g. square, round or oval. Supports 17, 18, made from wire, are fastened at a distance from each other on the carrier 16, each of which has, on the side away from the carrier 16, hook-shaped ends 19, 20. In accordance with the present invention, the hot wire 3 is covered with an electrically insulating thin layer and is fastened by soldering with its one end 21 to the hook-shaped end 19 in an electrically conducting manner. The hot wire is then brought from the end 21 to the hook-shaped end 20, brought around it, thus endfolding it, brought back again to the hook-shaped end 19, also endfolding it while being brought around it, and taken back again to the hook-shaped end 20 on which the other end 22 of the hot wire is fastened again by soldering in an electrically conducting manner. Thus the hot wire 3 is brought around the hook-shaped ends 19, 20 with its two ends 21, 22 in the shape of a coil. The number of coils of the hot wire 3 around the hook-shaped ends 19, 20 depends in each case on the requirements of the measuring apparatus. A thin platinum wire with a diameter of about 30 to 70 μm, provided with an insulating layer of about 1 to 2 μm of, for instance, glass, can serve as the hot wire 3. The hook-shaped ends 19, 20 can each have a guide section 23, 24 which acts to bundle the hot wire coils 3 closely to one another.

Figure 3:
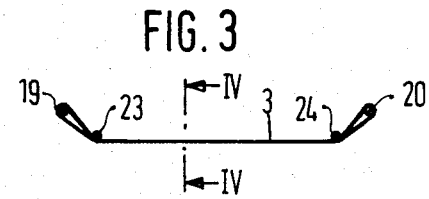
FIG. 3 is a section long line III—III of FIG. 2.
Figure 4:
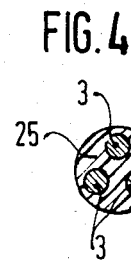
FIG. 4 is a section long line IV—IV of FIG. 3.

As shown in FIG. 3, it would be advantageous to tilt the hook-shaped ends 19, 20 out of the plane on the same side by means of the attaching points of the supports 17, 18 on the carrier 16. Furthermore, the wire sections of the supports 17, 18 on either side of the guide sections 23, 24 should be at an angle to each other. In accordance with the description in FIG. 4 the bundled hot wire coils 3 can be surrounded by a common protective layer 25, which can, for instance, also be of glass. The protective layer 25 should be formed of a material which prevents as much as possible and fouling or sedimentation. The supports 17, 18 are advantageously made from an electrically conductive material and serve as electrical connections of the hot wire 3.

Figure 5:
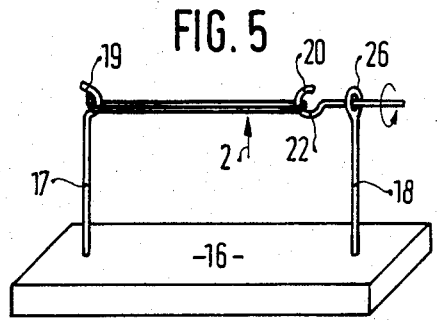
FIG. 5 is a second exemplary embodiment of an apparatus according to the invention.

In the second exemplary embodiment in accordance with FIG. 5, two supports 17, 18 are fastened on a carrier 16, wherein the support 17 has a hook-shaped end 19 and the support 18 a hook-shaped end 20. The hook-shaped end 20 is inserted through an opening 26 of the support 18 and is pivotably fixed in it. In accordance with the embodiment of FIG. 2, the hot wire 3, equipped with an electrically insulating layer, is fastened in an electrically conductive manner with its end 21 to the hook-shaped end 19 and is then brought, in the form of a coil, to the hook-shaped 20, back from there to the hook-shaped end 19 and again back to the hook-shaped end 20, with which its other end 22 is connected in an electrically conductive manner. Of course, the hot wire 3 can also have a larger amount of coils between its ends 21 and 22 around the hook-shaped ends 19, 20.

Figure 6:
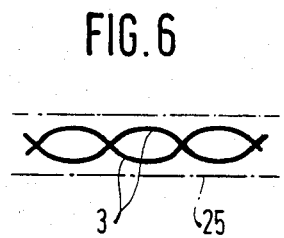
FIG. 6 is a partial view of hot wire coils twisted together and shown in a changed scale in accordance with the exemplary embodiment acoding to FIG. 5.

As shown in FIG. 6, the hot wire coils 3 can be twisted by turning the hook-shaped end 20 within the opening 26 in any desired way. Once the twisting of the hot wire coil 3 is sufficient, the hook-shaped end 20 can be fixed, for instance by soldering of gluing, in the opening 26 of the support 18. According to the description in FIG. 4, the twisted hot wire coil 3 now can also be covered with a common protective layer 25, which should resist sedimentation.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for measuring the mass of a flowing medium, especially for measuring the amount of aspirated air in internal combustion engines, having an electronic regulating circuit and a temperature-dependent measuring resistor in the form of a hot wire placed in said medium flow, comprising supports having hook-shaped ends for supporting respective ends of said hot wire in an electrically conducting manner, said hot wire being covered with an electrically insulating layer, said hot wire being disposed between said supports and looped between said hook-shaped ends into at least one coil around said supports, and said hook-shaped ends include guide means for bundling said hot wire coil closely together.

2. An apparatus in accordance with claim 1, wherein said hot wire coil is covered with a common protective layer.

3. An apparatus for measuring the mass of a flowing medium, especially for measuring the amount of aspirated air in internal combustion engines, having an electronic regulating circuit and a temperature-dependent measuring resistor in the form of a hot wire placed in said medium flow, comprising supports having hook-shaped ends for supporting respective ends of said hot wire in an electrically conducting manner, said hot wire being covered with an electrically insulating layer, said hot wire being disposed between said supports and looped between said hook-shaped ends into at least one coil around said supports, and the hook-shaped end of at least one of said supports is pivotably mounted with respect to said support, whereby said hot wire coil may be twisted together by rotating said pivotably mounted hook-shaped end.

4. An apparatus in accordance with claim 3, wherein said hot wire coil is covered with a common protective layer.

* * * * *